United States Patent

Riegler et al.

[11] 4,138,166
[45] Feb. 6, 1979

[54] SLIDE-ARTICULATION BEARING, IN PARTICULAR FOR TILTABLE CONVERTERS

[75] Inventors: Ernst Riegler, Enns; Manfred Schmidt, Linz, both of Austria

[73] Assignee: Vereinigte Österreichische Eisen- und Stahlwerke - Alpine Montan Aktiengesellschaft, Linz, Austria

[21] Appl. No.: 865,748

[22] Filed: Dec. 29, 1977

[30] Foreign Application Priority Data

Jan. 26, 1977 [AT] Austria ................................ 457/77
Feb. 10, 1977 [AT] Austria ................................ 882/77

[51] Int. Cl.² ............................................ F16C 23/04
[52] U.S. Cl. .................................... 308/3 R; 266/91;
308/5 R; 308/72; 308/239
[58] Field of Search ............... 308/3 R, 3.5, 5 R, 36.1,
308/72, 73, 194, 35, 237, 239, 74, 75, 240, 22,
DIG. 8; 266/91, 245, 246

[56] References Cited

U.S. PATENT DOCUMENTS

| 3,523,714 | 8/1970 | Pühringer ...................... 266/246 X |
| 3,819,241 | 6/1974 | Memmel .............................. 308/3 R |
| 4,072,372 | 2/1978 | Korrenn et al. .................. 308/239 X |

Primary Examiner—Trygve M. Blix
Assistant Examiner—Douglas C. Butler
Attorney, Agent, or Firm—Brumbaugh, Graves, Donohue & Raymond

[57] ABSTRACT

A slide-articulation bearing, in particular for tiltable converters, with an inner race placed on a shaft, an outer race inserted in a bearing housing, and sliding elements inserted between the inner and outer races so as to permit a relative movement of these races, has the sliding elements embedded in recesses of the inner or outer race, which recesses are vertically directed towards the cylindrical surface of the shaft.

8 Claims, 5 Drawing Figures

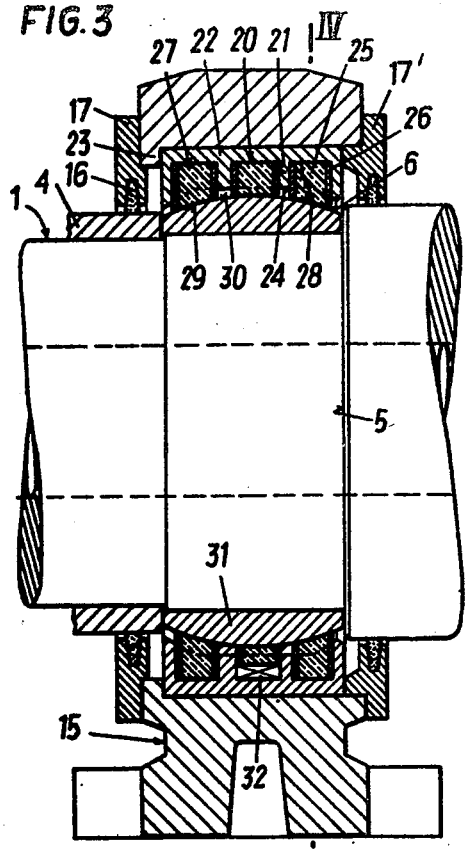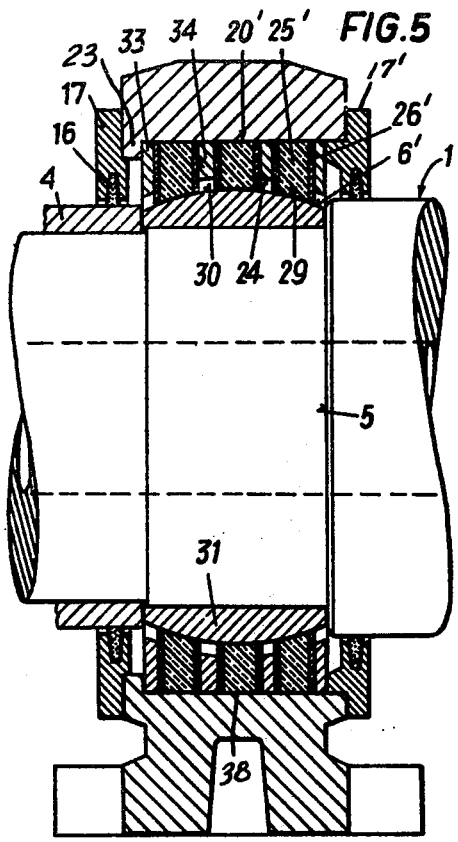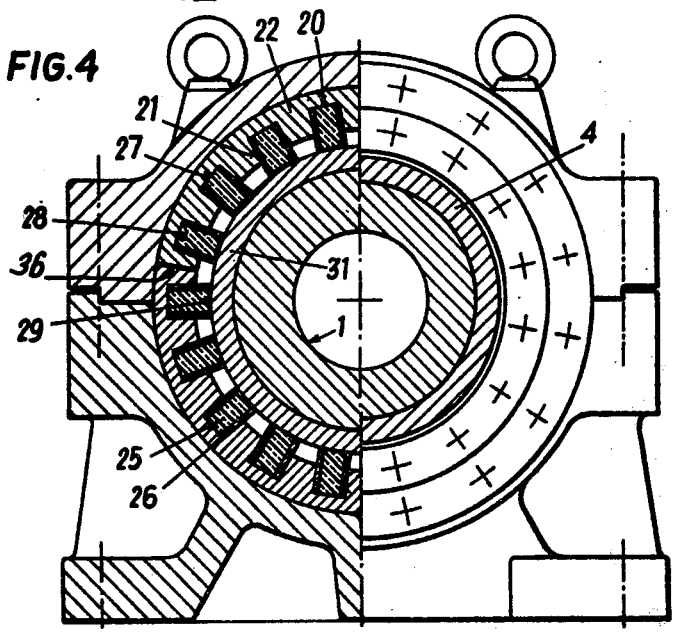

SLIDE-ARTICULATION BEARING, IN PARTICULAR FOR TILTABLE CONVERTERS

BACKGROUND OF THE INVENTION

The invention relates to a slide-articulation bearing, in particular for tiltable converters, having an inner race tightly arranged on the axle or shaft to be supported, an outer race inserted in a bearing housing, and sliding elements inserted between the inner and outer races so as to permit a relative movement of these races. The sliding elements are fixed relative to the inner or outer race and one race has a spherical sliding face which the sliding elements contact.

A bearing of this kind has been known in which sliding elements are inserted between an inner race having a spherical outer face and an outer race having a spherical inner face, which sliding elements contact these spherical faces of the inner and outer race with their own spherically-shaped end faces. For fixing the position of the sliding elements, a spherically shaped and divided cage is provided in this bearing, which cage has bores directed towards the center of the bearing, i.e. towards the centre of the spherical faces, in which bores the sliding elements are inserted.

Such bearings are producible only with great production expenditures, due to the great number of spherical faces whose production requires great precision. Repairs at these bearings can be carried out only by the producer himself, since for all parts of the bearings, precision machine tools, such as those used in the antifriction bearing production, are required. In addition to the spherical faces, the production of the bores directed towards the bearing center and designed for accommodation of the sliding elements, also involves difficulties.

SUMMARY OF THE INVENTION

The invention aims at avoiding these disadvantages and difficulties and has as its object to create a bearing of the above-defined kind in which the number of spherical faces that must be produced with great care is reduced, the number of bearing parts is reduced and the production of the bearing parts is simplified, thus reducing the cost of the bearing.

These objects are achieved according to the invention by embedding the sliding elements in recesses of the inner or outer race, which recesses are perpendicularly directed to the cylindrical surface of the axle or shaft.

The bearing according to the invention shows the following advantages:

Since the bearing race comprising the recesses for the sliding elements serves at the same time as a cage for the sliding elements, a separate cage is not necessary. The results are a simplification of the bearing and a lower construction height, since the diameter of the outer race can be kept smaller.

The outer face of the bearing inner race (if the recesses are provided in the inner race) or the inner face of the outer race (if the outer race comprises the recesses) only, needs to have a turned face, grinding is not necessary.

The outer face of the inner race or the inner face of the outer race, furthermore, can have any shape; care has merely to be taken that the sliding elements are sufficiently covered by the inner race or outer race, respectively, i.e. that they will not project by more than approximately 5 to 7 mm.

The race which takes over the function of a bearing cage can be produced of naturally hard carbon steel, hardening or quenching and tempering of the respective race is not necessarily required.

The sliding elements are arranged with their axes perpendicular to the surface of the shaft, thus considerably facilitating the production of the recesses accommodating the sliding elements as compared to recesses directed towards the bearing center, i.e. towards the spherical center of the spherical sliding face.

The sliding elements only have a spherical sliding face at one end, thus leading to a further simplification in the production of the bearing.

The production of the bearing race taking over the function of the bearing cage is simplified on the whole to such an extent that it need not be bought from the bearing producers any more, but can be produced by the user; this results in considerable cost saving and additional time saving when repairs are needed.

Suitably the recesses are designed as blind holes with plane bottoms.

According to a preferred embodiment the recesses penetrate the inner race, thus making the observance of depth tolerances for the recesses unnecessary.

In this case it is advantageous, if the sliding elements with their ends directed towards the axle or shaft contact the surface of the axle or shaft.

According to a further embodiment of the slide-articulation bearing of the invention, the recesses penetrate the outer race.

In this case it is advantageous, if the sliding elements with their ends directed towards the bearing housing contact the bearing housing.

BRIEF DESCRIPTION OF THE DRAWINGS

The invention will now be explained in more detail by way of several embodiments and with reference to the accompanying drawings, wherein:

FIG. 4 represents a partial section along line IV—IV of FIG. 3.

DESCRIPTION OF EXEMPLARY EMBODIMENTS

A shaft is denoted with 1, and on this shaft a bearing inner race 3 provided with a circular-cylindrical inner face 2 is slipped on.

Figure 1:
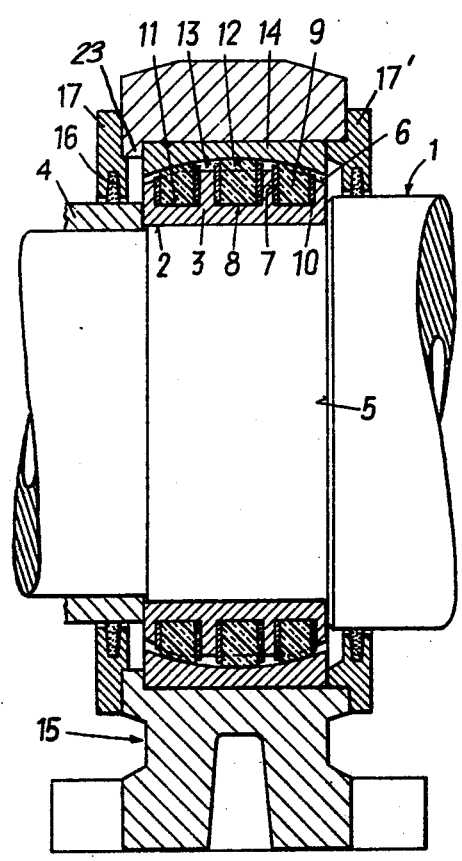
FIGS. 1 and 2 each show a schematically represented embodiment of a bearing in an axial section with the recesses being provided in the bearing inner race, FIGS. 3 and 5 each show a schematically illustrated embodiment of a bearing in an axial section, the sliding elements being inserted in recesses of the bearing outer race.

The inner race 3 is braced against a shoulder 5 of the shaft 1 by a distance bushing 4, so as to sit tightly on the shaft. Bores 7 for accommodation of sliding elements 8 are provided from the outer face 6 of the inner race 3 in the radial direction, i.e. perpendicularly to the circular-cylindrical shaft surface. The sliding elememnts 8 are composed of a body 9, preferably produced of synthetic material, and a metal ring 10 enclosing the body. According to the embodiment illustrated in FIG. 1, the bores 7 are designed as blind holes having plane or flat bottoms accommodating the sliding elements 8 with one end 11. The outwardly extending ends 12 of the sliding elements are provided with a spherical face contacting an inner face 13 — also spherically shaped — of an axially divided outer race 14 so as to permit wobbling and rotating movements of the shaft relative to the inner face. The division of race 14 is not shown, but it is the same as the division of outer race 22 shown in the embodiment of FIG. 4. The outer race 14 is immovably installed in a bearing housing 15 against shoulder 23 of that housing, which housing is also divided into two sections. Side lids 17, 17' provided with seals 16 serve for securing and protecting the bearing.

The outer face 6 of the bearing inner race 3 has a circular-cylindrical shape in the bearing central part and a conical shape towards the side lids 17. It could, however, also have any other shape, such as one formed of circular cylinders having different diameters, so long as it is ensured that the sliding elements do not project out of the inner race too much. Since, no special machining of the outer face 6 is necessary, it can be maintained in the turned condition.

Figure 2:
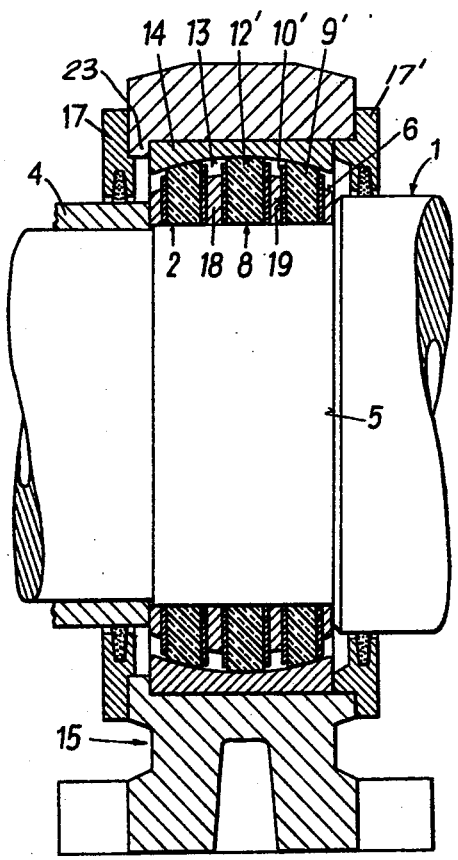

In FIG. 2 a further embodiment of the bearing according to the invention is illustrated. The inner race 18 of this bearing has continuous bores 19 for accommodating the sliding elements, thus facilitating the production of the inner race 18, since no special depth has to be observed when drilling the bores 19. Sliding elements 8', comprised of material 9' and metal ring 10', then advantageously have such a length that they directly contact the shaft with their inwardly projecting ends, without any intermediate element. The other ends 12' of sliding elements 8' contact the outer race as in FIG. 1.

With the embodiment represented in FIGS. 3 and 4, the sliding elements 20 are embedded in recesses 21 of the outer race 22, the outer race thus functions as a bearing cage. The outer race 22, which is divided into two sections which meet at joint 36, is braced against shoulder 23 of the bearing housing 1 by side lid 17', so that it is tightly arranged in the bearing housing.

The recesses 21 of the outer race are designed as bores drilled from the inner face 24 of the outer race 22 in a radial direction, i.e. perpendicular to the axis of the bearing housing 15 and perpendicular to the circular-cylindrical surface of the shaft 1 that is supported. The direction perpendicular to the shaft surface corresponds to the direction perpendicular to the axis of the bearing housing in the normal position of the slide-articulation bearing, i.e. when the shaft is aligned with the axis of the bearing housing and makes no wobbling movements. In the case of wobbling movements of the shaft there will be slight deviations. The sliding elements 20 are also composed of a body 25, preferably produced of synthetic material, and a metal ring 26 enclosing the body. The recesses 21, according to the embodiment illustrated in FIG. 3, are designed as blind holes having flat bottoms 27, on which the sliding elements 20 rest with one end 28. Ends 29 of the sliding elements 20, which are directed towards the shaft 1, are provided with a spherical face contacting the outer face 30 of the inner race 31, which is also spherical, so that wobbling and rotating movements of the shaft relative to the outer race 22 are possible.

The inner face 24 of the bearing outer race 22 has a circular-cylindrical shape in the bearing central part, and towards the side lids 17, 17' it has a conical shape. It could, however, have any other shape, such as one formed of circular cylinders having different diameters, so long as it is ensured that the sliding elements 20 do not project too much from the outer race 22. A special machining of the inner face 24 is, therefore, not necessary and it can be maintained in the turned condition.

As can be seen from FIG. 3, the sliding elements 20 are arranged in three adjacent rows, each of which extends in the peripheral direction of the shaft. The sliding elements of the middle row are placed in the load region of the bearing on force measuring devices 32, e.g. commercially available transducers, thus permitting the measurement of loads on the bearing, which measurements are of special importance in converter plants for determining the weight of a charge. Since the sliding elements 20 are fixed relative to the outer race 22, there is no difficulty in providing conduits for the electrical wires of the force measuring devices within the bearing and in leading the wires outwards from the measuring device.

In FIG. 5 a further embodiment of the bearing according to the invention is illustrated. The outer race 33 of this bearing has continuous bores 34 for accommodation of sliding elements 20', thus simplifying the production of the outer race 33, since no special depth has to be observed when drilling the bores 34. The sliding elements 20', comprised of material 25' and ring 26' then advantageously have such lengths that they directly contact the bearing housing with their outwardly directed ends. However, with this embodiment force measuring devices can also be provided in the load region of the bearing. They are inserted between the sliding elements and the bearing housing at location 38.

What we claim is:

1. In a slide-articulation bearing assembly for supporting a shaft having a cylindrical surface, said assembly being of the type including a bearing housing, an inner race fixedly arranged on said shaft to be supported, an outer race inserted in said bearing housing, and sliding elements inserted between said inner race and said outer race so as to permit a relative movement between said inner race and said outer race, said sliding elements being fixed relative to said inner race and said outer race having a spherical sliding face contacting said sliding elements, the improvement comprising recesses in said inner face extending perpendicular to the cylindrical surface of the shaft, said sliding element being embedded in said recesses.

2. A slide-articulation bearing assembly as set forth in claim 1, wherein said recesses are designed as blind holes having plane bottoms.

3. A slide-articulation bearing assembly as set forth in claim 1, wherein said recesses penetrate completely through said inner race.

4. A slide-articulation bearing assembly as set forth in claim 3, wherein said sliding elements have ends directed towards said shaft, which ends contact said cylindrical surface of said shaft.

5. In a slide-articulation bearing assembly for supporting a shaft having a cylindrical surface, said assembly being of the type including a bearing housing, an inner race fixedly arranged on said shaft to be supported, an outer race inserted in said bearing housing, and sliding elements inserted between said inner race and said outer race so as to permit a relative movement between said inner race and said outer race, said sliding elements being fixed relative to said outer race and said inner race having a spherical sliding face contacting said sliding elements, the improvement comprising recesses in said outer race extending perpendicularly to the cylindrical surface of the shaft, said sliding elements being embedded in said recesses.

6. A slide-articulation bearing assembly as set forth in claim 5, wherein said recesses are designed as blind holes having plane bottoms.

7. A slide-articulation bearing assembly as set forth in claim 5, wherein said recesses penetrate completely through said outer race.

8. A slide-articulation bearing assembly as set forth in claim 7, wherein said sliding elements have ends directed towards said bearing housing, which ends contact said bearing housing.

* * * * *

UNITED STATES PATENT OFFICE
CERTIFICATE OF CORRECTION

Patent No. 4,138,166        Dated Feb. 6, 1979

Inventor(s) Riegler et al.

It is certified that error appears in the above-identified patent and that said Letters Patent are hereby corrected as shown below:

Col. 1, line 61, after "only" delete the comma.

Col. 2, line 59, "elememnts" should read --elements--.

Col. 4, line 41, "face" should read --race--.

Signed and Sealed this

Fifteenth Day of May 1979

[SEAL]

Attest:

RUTH C. MASON
*Attesting Officer*

DONALD W. BANNER
*Commissioner of Patents and Trademarks*